United States Patent [19]
Huang

[11] Patent Number: 5,374,059
[45] Date of Patent: Dec. 20, 1994

[54] SHOCK ABSORBING GRIP FOR RACQUETS AND THE LIKE

[76] Inventor: Ben Huang, 19472 Woodlands La., Huntington Beach, Calif. 92648

[21] Appl. No.: 196,010

[22] Filed: Feb. 10, 1994

Related U.S. Application Data

[63] Continuation-in-part of Ser. No. 637,931, Jan. 14, 1991, abandoned, Ser. No. 890,383, May 26, 1992, abandoned, Ser. No. 953,190, Sep. 29, 1992, and Ser. No. 58,313, May 3, 1993.

[51] Int. Cl.⁵ ............................................. A63B 49/08
[52] U.S. Cl. .................................... 273/75; 273/81 B
[58] Field of Search ................... 273/75, 73 J, 81 R, 273/165, 81.4, 81.5, 81.6, 81 B, 81 D

[56] References Cited

U.S. PATENT DOCUMENTS

| 1,139,843 | 5/1915 | Brown . | |
| 1,556,781 | 10/1925 | Gjorup . | |
| 1,701,856 | 2/1929 | Kraeuter . | |
| 1,940,104 | 12/1933 | Russell et al. | 273/81 |
| 1,943,399 | 1/1934 | Smith | 273/81 |
| 2,003,917 | 6/1935 | Bowden | 273/75 |
| 2,046,164 | 6/1936 | Herkner | 273/81 |
| 2,086,062 | 7/1937 | Bray | 273/81 |
| 2,166,044 | 7/1939 | Fletcher | 273/75 |
| 2,166,045 | 7/1939 | Fletcher | 273/75 |
| 2,513,655 | 7/1950 | Lamkin et al. | 273/81 |
| 3,582,456 | 6/1971 | Stolki | 161/165 |
| 3,654,066 | 4/1972 | Fukushima et al. | 161/160 |
| 3,845,954 | 11/1974 | Case | 273/75 |
| 3,848,480 | 11/1974 | Oseroff | 74/558.5 |
| 3,848,871 | 11/1974 | Sweet | 273/75 |
| 3,860,469 | 1/1975 | Gregorian et al. | 156/83 |
| 3,881,521 | 5/1975 | Johansen et al. | 138/126 |
| 3,899,172 | 8/1975 | Vaughn et al. | 273/73 |
| 4,015,851 | 4/1977 | Pennell | 273/75 |
| 4,044,625 | 8/1977 | D'Haem | 74/558.5 |
| 4,070,020 | 1/1978 | Dano | 273/73 |
| 4,100,006 | 7/1978 | Buckley | 156/78 |
| 4,174,109 | 11/1979 | Gaiser | 273/81.6 |
| 4,284,275 | 8/1981 | Fletcher | 273/75 |
| 4,347,280 | 8/1982 | Lau et al. | 428/304.4 |
| 4,454,187 | 6/1984 | Flowers et al. | 428/159 |
| 4,567,091 | 1/1986 | Spector | 428/222 |
| 4,647,326 | 3/1987 | Pott | 156/77 |
| 4,660,832 | 4/1987 | Shomo | 273/73 |
| 4,662,415 | 5/1987 | Prout | 150/52 |
| 4,736,949 | 4/1988 | Muroi | 273/73 |
| 4,765,856 | 8/1988 | Doubt | 156/212 |
| 4,853,054 | 8/1989 | Turner et al. | 156/78 |
| 4,934,024 | 6/1990 | Sexton, I | 16/111 |
| 5,042,804 | 8/1991 | Uke | 273/75 |
| 5,110,653 | 5/1992 | Landi | 428/116 |
| 5,275,407 | 1/1994 | Soong | 273/73 |

FOREIGN PATENT DOCUMENTS

| 2398099 | 7/1977 | France . |
| 2805314 | 8/1979 | Germany . |
| 3414978 | 10/1985 | Germany . |
| 443228 | 2/1936 | United Kingdom . |
| 870021 | 6/1961 | United Kingdom . |
| 979242 | 1/1965 | United Kingdom . |

Primary Examiner—William E. Stoll
Attorney, Agent, or Firm—Fulwider, Patton, Lee & Utecht

[57] ABSTRACT

A shock absorbing grip for the handle of a tennis racquet or the like having polyurethane layer bonded to a felt layer where the ratio of the thickness of the polyurethane layer to the felt layer is equal to or larger than about 0.18. The polyurethane layer is formed with a plurality of dimples, each of which merge into a perforation that extends through the felt layer to permit breathing of air through the grip as it is grasped by a tennis player.

5 Claims, 2 Drawing Sheets

SHOCK ABSORBING GRIP FOR RACQUETS AND THE LIKE

This is a continuation-in-part of application Ser. No. 07/637,921 filed on Jan. 14, 1991, now abandoned Ser. No. 07/890,383 filed on May 26, 1992, now abandoned Ser. No. 07/953,190 filed on Sep. 29, 1992, pending Ser. No. 08/058,313 filed on May 3, 1993, pending.

BACKGROUND OF THE INVENTION

The present invention relates to an improved grip for racquets and other devices employing handles that are subject to shock when such devices are impacted, as for example, tennis ball racquets, racquetball racquets, golf clubs, baseball bats and hammers.

It is well-known that shock generated by impact between a device such as a tennis racquet and a tennis ball can affect muscle tissue and arm joints such as elbow joints. Such shock often results in "tennis elbow" which is a painful affliction commonly experienced by active tennis players. Medical theories attribute "tennis elbow" to continuous exposure of the playing arm of a tennis player to shock and vibration generated by striking a tennis ball with a tennis racquet. The energy generated is usually of high frequency and short duration with rapid decay, and which is often known as "impact shock." Tight grasping of a grip to keep it from slipping contributes to "tennis elbow." Various types of grips have been proposed for inhibiting "tennis elbow," however, such grips have not solved such problem. The grip of the present invention successfully reduces or even eliminates "tennis elbow" type shock to the muscle tissue and arm joints of the users of tennis racquets, racquetball racquets, golf clubs, baseball bats, and other impact imparting devices such as hammers.

The prior art grips of this type have conventionally utilized a layer of polyurethane backed with a layer of felt. In general, the felt layer has a thickness of about 1.40 mm. The polyurethane layer is generally thinner than 0.25 mm, and has been considered only as providing tackiness, i.e., resistance to the slip caused by a sweaty hand. The polyurethane has not been considered to be useful for inhibiting shock. The felt was relied upon to cushion the user's arm and hand against the shock created when the ball hits the racquet. The polyurethane layer generally utilizes a smooth surface. The construction of some grips, however, utilized straight perforations extending through the grip.

SUMMARY OF THE INVENTION

Applicant has discovered that greatly improved shock absorbing qualities may be obtained in a grip for a tennis racquet or the like where the thickness of the polyurethane layer relative to the thickness of the felt layer is increased over the ratio employed in commercially sold prior art grips. Applicant has developed a grip particularly designed to provide excellent shock absorbing qualities when mounted upon the handle of "wide-body" tennis racquets which have recently achieved wide popularity. Applicant's improved grip utilizes the polyurethane layer not only to provide tackiness, but more importantly, to cushion the arm and hand of the racquet user against the shock created when the tennis ball hits the tennis racquet. A layer of felt is bonded to the inner surface of applicant's polyurethane layer in order to provide strength to such polyurethane layer, and also as a means for attaching the bonded-together polyurethane layer and textile layer to the racquet handle. The improved grip of the present invention additionally aligns the pores of the polyurethane layer generally normal to the longitudinal axis of the racquet handle so as to further improve the cushioning characteristics of the polyurethane layer.

It is an important feature of the present invention that the polyurethane layer is provided with a plurality of inwardly extending dimples, the lower portion of each of which merges into a perforation which extends through the felt layer. It has been found that when the grip is grasped by a player with the palm and fingers of the player's hand covering the dimples, air is first pumped inwardly through the dimple and perforations, and then into the felt. When the player relaxes his grip, and uncovers the dimples, air will be sucked back through the perforations and dimples. The felt layer permits movement of the air inwardly and outwardly relative to the grip because of its porosity. The interchange of air as it is pumped through the grip serves to evaporate perspiration which would normally accumulate on the exterior surface of the polyurethane layer. Accordingly, the player maintains a better grasp of the grip than is true with previously known grips. In this manner, the player's accuracy is improved. Also, the tendency of the player to acquire "tennis elbow" is reduced.

DETAILED DESCRIPTION OF A PREFERRED EMBODIMENT

Figure 5:
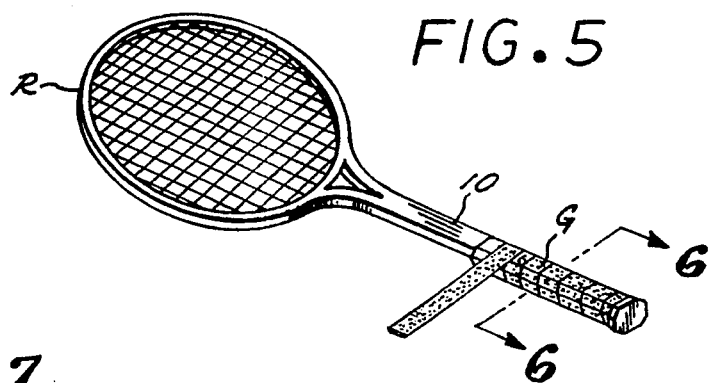
FIG. 5 is a perspective view in reduced scale showing the grip of FIGS. 1 through 4 being applied to the handle of a tennis racquet.
Figure 6:
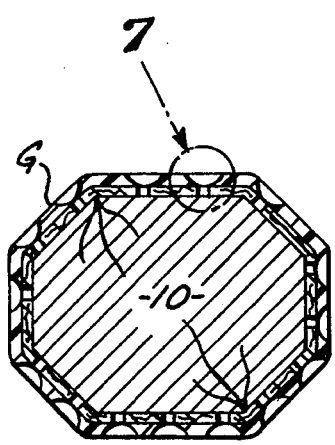
FIG. 6 is a vertical sectional view taken in enlarged scale along line 6—6 of FIG. 5.

Referring to the drawings, the improved shock absorbing grip G of the present invention is shown in FIG. 5 attached to the handle 10 of a tennis racquet R. The grip G incudes an open-pored textile layer generally designated 12 having an inner surface 14 which is adhered to the racquet handle 10. The grip also includes a smooth closed pore polyurethane layer generally designated 16 which is bonded to the textile layer 12. The bonded-together polyurethane and textile layers are seen to be configured as a unitary strip which is wrapped about the racquet handle 10 in the manner depicted in FIG. 5.

Figure 4:
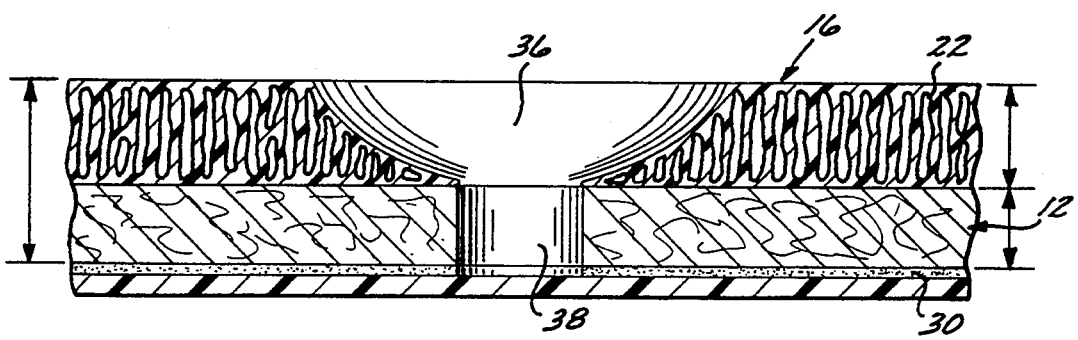
FIG. 4 is a further enlarged view of the encircled area designated 4 in FIG. 3.
Figure 7:
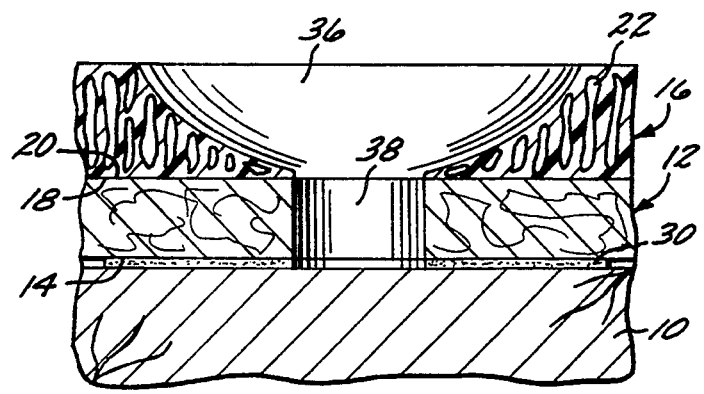
FIG. 7 is a further enlarged view of the encircled area designated 7 in FIG. 6.
Figure 8:
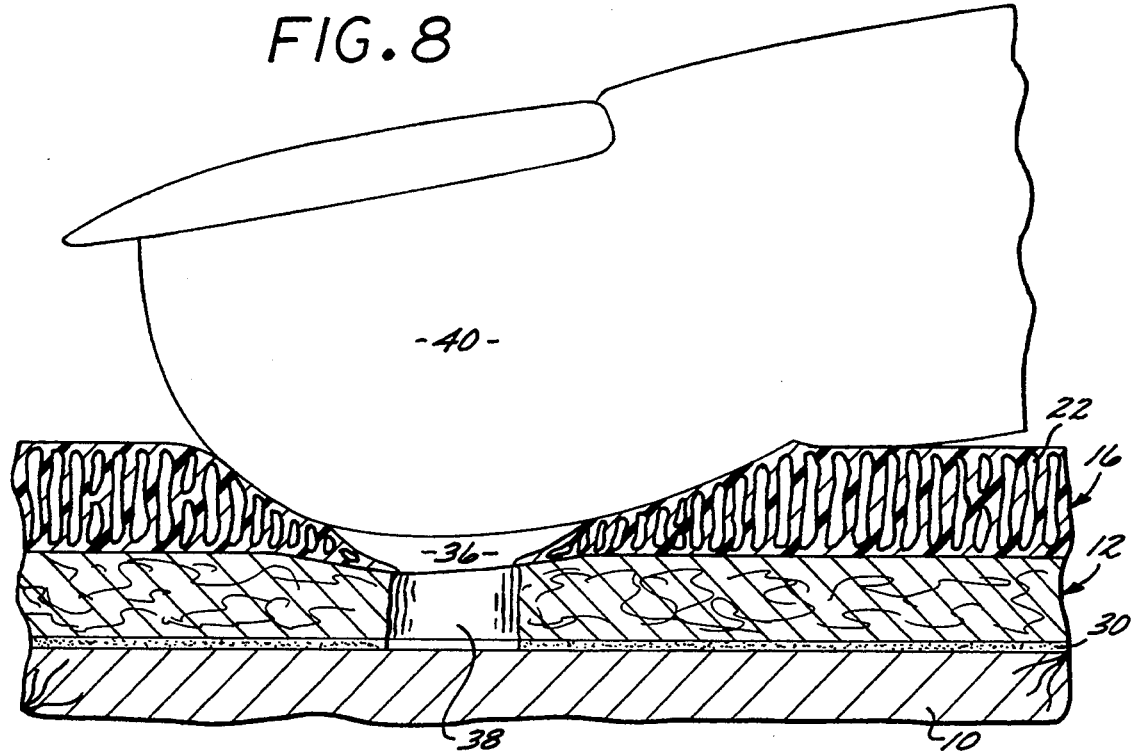
FIG. 8 is a sectional view showing how the improved grip of the present invention deforms when grasped by a user.

More particularly, the textile layer 12 is formed of a suitable open-pored material, such as felt, and has its upper surface 18 bonded to the lower surface 20 of the polyurethane layer 16. As indicated in FIGS. 4, 7 and 8, the polyurethane layer 16 is formed with pores 22 which extend vertically, i.e., generally normal to the longitudinal axis of racquet handle 10 when the grip is affixed to such handle. The polyurethane layer 16 may be formed in a conventional manner by coating one side of a felt strip with a solution of polyurethane (e.g., polyester or polyether) dissolved in dimethyl formamide (DMF), immersing the coated strip in water baths to displace the DMF and to cause the urethanes to coagulate, and finally driving off the water by the application of pressure and heat. In this manner, pores 22 extending perpendicularly relative to the strip's longitudinal axis are formed while the underside of the polyurethane strip is bonded to the outer surface 18 of the felt strip.

Figure 1:
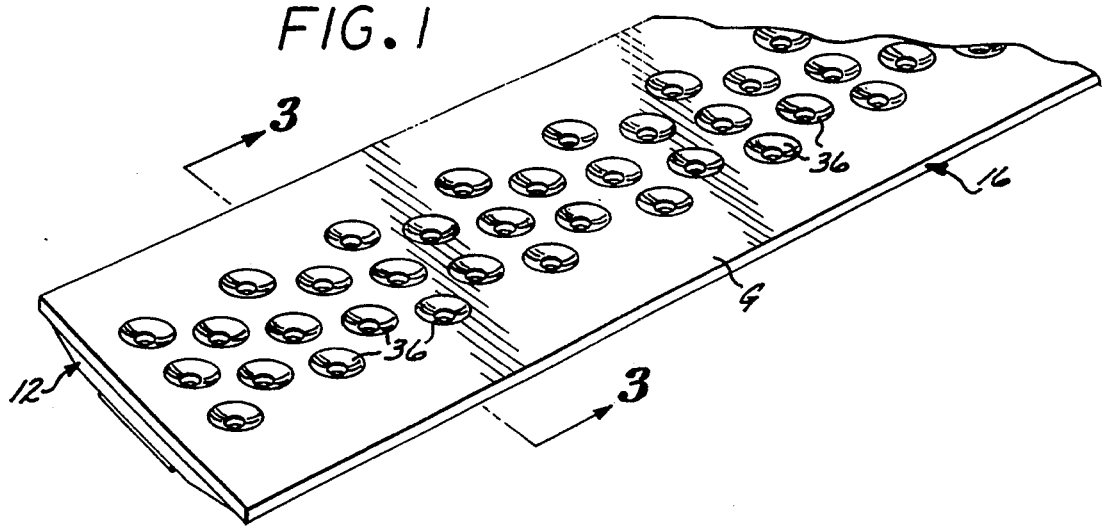
FIG. 1 is a broken perspective view of an improved shock absorbing grip embodying the present invention.
Figure 2:
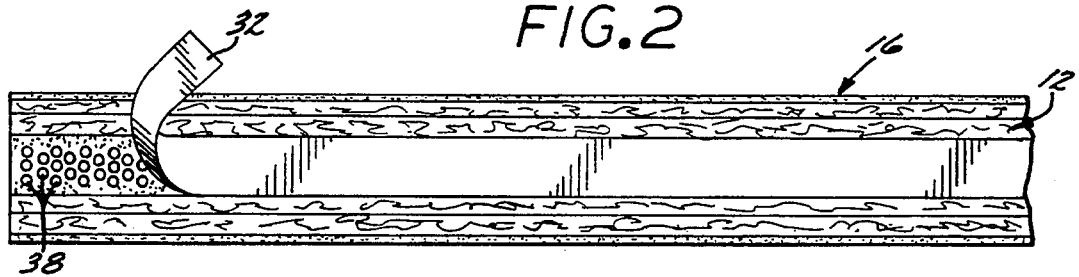
FIG. 2 is a broken view of the underside of said grip.
Figure 3:
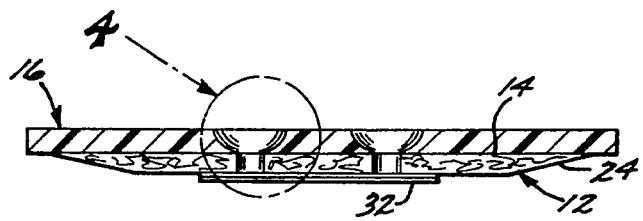
FIG. 3 is a vertical sectional view taken in enlarged scale along line 3—3 of FIG. 1.

As indicated in FIG. 3, the portions of the felt layer 12 outwardly of its central region are slanted upwardly and outwardly at 24 to facilitate wrapping of the completed polyurethane and felt strip around the racquet handle 10. The underside 14 of the felt is provided with a conventional adhesive layer 30 which is originally covered with a protective quick-release tape 32. To apply the grip G to the racquet handle 10, the protective tape 32 is stripped off the adhesive 30 as indicated in FIG. 2. Thereafter, the strip of bonded-together polyurethane and felt is tightly wrapped around the racquet handle 10, as is conventional in mounting tennis handle grips of this type.

The purpose of the layer of polyurethane 16 is primarily to provide a cushioning effect for the grip when the tennis racquet R impacts a tennis ball (not shown). The polyurethane layer 16 also provides tackiness so as to inhibit the racquet user's hand from slippage as the tennis ball is struck. The felt layer 12 provides strength to the polyurethane layer 16 and also serves as a means for attaching the bonded-together polyurethane and felt strip to the racquet handle. The polyurethane layer is provided with a plurality of inwardly extending dimples 36, the lower portion of each of which merges into a perforation 38 which extends through the felt layer 12. It has been found that when the grip G is grasped by a player with the palm and fingers of the player's hand covering the dimples 36, air is first pumped inwardly through the dimple 36 and perforations 38, and then into the felt. When the player relaxes his grip, and uncovers the dimples 36, air will be sucked back through the dimples and perforations to achieve "breathing" of air by the grip. The felt layer permits movement of the air inwardly and outwardly relative to the grip because of its porosity. The interchange of air as it is pumped through the grip serves to evaporate perspiration which would normally accumulate on the exterior surface of the polyurethane layer. Accordingly, the player maintains a better hold on the grip than is true with previously known grips, and is less likely to acquire "tennis elbow." It has been determined that good results are obtained where a diameter of about ⅛" is utilized for the dimples at the intersection with the outer surface of the polyurethane layer, and a diameter of about 1/32" is used for the perforations.

As noted hereinbefore, applicant has discovered that greatly improved shock absorbing qualities may be obtained in a tennis racquet grip where the thickness of the polyurethane layer relative to the thickness of the felt layer is increased over the ratio employed in prior art grips. More specifically, applicant considers that the ratio of the thickness of the polyurethane layer to the textile layer should be a minimum of approximately 0.28, i.e., equal to or larger than approximately 0.18. In the embodiment shown in the drawings, and as indicated in FIG. 4, in a grip having a total thickness of 2.0 mm, the polyurethane layer has a thickness of 1.1 mm, while the felt layer has thickness of 0.9 mm, i.e., the thickness of the polyurethane body is about equal to or slightly thicker than the thickness of the textile body. Excellent results have been obtained with this ratio.

Referring now to FIG. 8, such figure shows how the improved grip G of the present invention deforms when grasped by the fingers 40 of a user. Thus, the user's fingers compress the polyurethane layer to a considerable extent while only slightly compressing the felt layer 12. Compression of the polyurethane is enhanced by the vertical alignment of the pores 22. Such compression not only greatly inhibits the shock applied by the racquet to the user's arm and hand crated when the tennis ball hits the tennis racquet, but also permits the aforementioned "breathing" of air by the grip. Additionally, the extent of compression afforded by the polyurethane enhances the gripping power of the user's hand, particularly when coupled with the tackiness of the polyurethane.

Another advantage of the present invention results from the lower cost of the polyurethane as compared to the cost of the felt. Because of this differential in cost, the cost of manufacturing a grip embodying the present invention can be less than the cost of manufacturing prior art grips.

Various modifications and changes may be made with respect to the foregoing detailed description without departing from the spirit of the present invention. By way of example, although the grip G is shown as taking the form of an elongated strip which is wrapped around the handle of a tennis racquet, such grip could also be fabricated into a sleeve which is slipped over the portion of a tennis racquet that is gripped by a player.

I claim:

1. The combination of a handle for an impact imparting device, and a grip to be applied over such handle to conform to the external configuration of such handle, said grip comprising:
    an open-pored textile layer having an inner surface adhered to and abutting said handle and a smooth closed pore polyurethane layer having its inner surface bonded to the outer surface of the textile layer remote from said handle, with the pores of such polyurethane layer extending generally normal to the longitudinal axis of said handle, the thickness ratio of the transverse central region of the polyurethane layer/textile layer being equal to or larger than approximately 0.18, the textile layer providing strength for the polyurethane layer while the polyurethane layer both absorbs shocks and provides tackiness so as to inhibit slippage of a user's hand relative to said handle, and with the polyurethane layer being formed with a plurality of inwardly extending dimples, the lower end of each of which merge into a perforation that extends inwardly through said felt layer, air being forced through said dimples and perforations when the grip is grasped by a user with his palm and fingers covering some of the dimples.

2. The combination as set forth in claim 1 wherein the diameter of each dimple at its intersection with the outer surface is about ⅛", and the diameter of each perforation is about 1/32".

3. The combination as set forth in claim 1 wherein the thickness ratio of the transverse central region of the polyurethane layer is about equal to or thicker than the thickness of the textile layer.

4. The combination as set forth in claim 1 wherein the grip is in the form of a strip which is spirally wrapped about the handle.

5. The combination as set forth in claim 4 wherein the thickness of the textile layer tapers from a transverse central region towards the transverse sides to facilitate wrapping of the strip about said handle.

* * * * *